United States Patent
Hirose et al.

(10) Patent No.: US 10,947,666 B2
(45) Date of Patent: Mar. 16, 2021

(54) LEATHER-LIKE FABRIC

(71) Applicant: Toray Industries, Inc., Tokyo (JP)

(72) Inventors: Tomoharu Hirose, Osaka (JP); Akihito Tsukamoto, Osaka (JP); Katsuya Okajima, Osaka (JP); Masaru Masaki, Osaka (JP)

(73) Assignee: Toray Industries, Inc., Tokyo (JP)

( * ) Notice: Subject to any disclaimer, the term of this patent is extended or adjusted under 35 U.S.C. 154(b) by 480 days.

(21) Appl. No.: 15/749,334

(22) PCT Filed: Jul. 5, 2016

(86) PCT No.: PCT/JP2016/069829
§ 371 (c)(1),
(2) Date: Jan. 31, 2018

(87) PCT Pub. No.: WO2017/022387
PCT Pub. Date: Feb. 9, 2017

(65) Prior Publication Data
US 2018/0230645 A1  Aug. 16, 2018

(30) Foreign Application Priority Data

Jul. 31, 2015 (JP) .............................. JP2015-152069

(51) Int. Cl.
*D06N 3/00* (2006.01)
*D04H 1/4391* (2012.01)
*B32B 5/26* (2006.01)
*D06N 3/14* (2006.01)
*B32B 5/02* (2006.01)
*D04H 1/4291* (2012.01)
*D04H 1/435* (2012.01)
*D06N 3/12* (2006.01)

(52) U.S. Cl.
CPC ........... *D06N 3/0075* (2013.01); *B32B 5/022* (2013.01); *B32B 5/024* (2013.01); *B32B 5/26* (2013.01); *D04H 1/4291* (2013.01); *D04H 1/435* (2013.01); *D04H 1/4391* (2013.01); *D06N 3/00* (2013.01); *D06N 3/0004* (2013.01); *D06N 3/0006* (2013.01); *D06N 3/0011* (2013.01); *D06N 3/0029* (2013.01); *D06N 3/0072* (2013.01); *D06N 3/0077* (2013.01); *D06N 3/0095* (2013.01); *D06N 3/0097* (2013.01); *D06N 3/12* (2013.01); *D06N 3/14* (2013.01); *B32B 2250/02* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/0253* (2013.01); *B32B 2262/0284* (2013.01); *B32B 2307/724* (2013.01); *D06N 2201/02* (2013.01); *D06N 2201/0254* (2013.01); *D06N 2201/10* (2013.01); *D06N 2203/06* (2013.01); *D06N 2209/108* (2013.01); *D06N 2209/123* (2013.01)

(58) Field of Classification Search
CPC .. D06N 3/0075; D06N 3/0095; D06N 3/0011; D06N 3/0006; D06N 3/12; D04H 1/4391; D04H 1/435; D04H 1/4291; B32B 5/26; B32B 5/022; B32B 5/024
See application file for complete search history.

(56) References Cited

U.S. PATENT DOCUMENTS

| | | | |
|---|---|---|---|
| 2004/0142148 A1 | 7/2004 | Feng et al. | |
| 2004/0224122 A1* | 11/2004 | Yamasaki | ............ D06N 3/0004 428/96 |
| 2010/0151133 A1* | 6/2010 | Mimura | ............... D06N 3/0004 427/264 |
| 2010/0239817 A1 | 9/2010 | Makimura et al. | |
| 2012/0308726 A1 | 12/2012 | Kang et al. | |
| 2015/0299944 A1* | 10/2015 | Sugiura | ................ D06N 3/0006 428/137 |
| 2016/0002846 A1* | 1/2016 | Yoshimoto | ........... D06N 3/0004 428/151 |
| 2016/0251797 A1 | 9/2016 | Wakimoto et al. | |

FOREIGN PATENT DOCUMENTS

| | | |
|---|---|---|
| CN | 102808333 A | 12/2012 |
| CN | 104452327 A | 3/2015 |
| CN | 104532601 A | 4/2015 |
| EP | 0134635 A2 | 3/1985 |
| JP | 64-18192 U | 1/1989 |
| JP | H09-67779 A | 3/1997 |
| JP | 3133957 B2 | 2/2001 |
| JP | 2001-214376 A | 8/2001 |
| JP | 2002-317387 A | 10/2002 |

(Continued)

OTHER PUBLICATIONS

Extended Euoropean Search Report dated Mar. 1, 2019, of counterpart European Application No. 16832666.8.

(Continued)

*Primary Examiner* — Jeremy R Pierce
(74) *Attorney, Agent, or Firm* — DLA Piper LLP (US)

(57) ABSTRACT

A leather-like fabric has a feel of natural nubuck leather and a napped feel and air permeability of suede leather, as well as high wear resistance. The leather-like fabric includes a fibrous structure including ultrafine fibers having an average monofilament fineness of 0.0001 dtex or more and 0.5 dtex or less, at least one surface of the fibrous structure being napped, the napped surface having resin layers located discontinuously, and each of the resin layers containing two or more layers.

9 Claims, No Drawings

(56) References Cited

FOREIGN PATENT DOCUMENTS

| | | |
|---|---|---|
| JP | 3409554 B2 | 5/2003 |
| JP | 2009-72986 A | 4/2009 |
| JP | 2012-136801 A | 7/2012 |
| JP | 5415195 B2 | 2/2014 |
| JP | 5452477 B2 | 3/2014 |
| JP | 2015-10305 A | 1/2015 |
| TW | 201500200 A | 1/2015 |
| TW | I467074 B | 1/2015 |
| WO | 2015/064078 A1 | 5/2015 |

OTHER PUBLICATIONS

Letter of Examination Report dated Jan. 31, 2020, of counterpart Taiwanese Application No. 105121742, along with an English translation.

Notice of Reasons for Refusal dated Apr. 7, 2020, of counterpart Japanese Application No. 2017-532438, along with an English translation.

Second Office Action dated Jun. 2, 2020, of counterpart Chinese Application No. 2016800430543, along with an English translation.

* cited by examiner

LEATHER-LIKE FABRIC

TECHNICAL FIELD

This disclosure relates to a leather-like fabric having a feel of natural nubuck leather and a napped feel and air permeability of suede leather, as well as high wear resistance.

BACKGROUND

Suede-like artificial leather produced from ultrafine fibers and a polymeric elastomer has durability, consistency, and other excellent characteristics absent in natural leather products. Because of such features, suede-like artificial leather has been used in a wide variety of applications including garments, furniture, and automobile interior materials. Even wider applications are expected recently, and there is a demand for the development of artificial leather products having qualities other than those of suede-like artificial leather.

Such applications include full grain type and nubuck type leather products. Natural nubuck leather is produced by napping the grain side of leather as opposed to suede leather. Accordingly, nubuck leather has surface denseness and flatness like those of the grain side of the leather while maintaining a wet texture. There have been no nubuck-like artificial or synthetic leather materials that have sufficiently high quality and texture or sufficiently high functions such as wear resistance and air permeability.

With regard to nubuck-like artificial leather products, there is a method including the steps of applying a resin solution to a napped surface of a leather-like sheet containing ultrafine fibers and then further separating the applied resin by a chemical and/or mechanical technique to expose the napped fibers (see Japanese Patent No. 3409554). That method, however, has the problem of serious damage in the resin layer parts caused during the separation step, leading to poor wear resistance.

To achieve high wear resistance, there is a method in which the surface of a polyurethane resin base is polished and a leather design is printed on its surface using polyurethane resin (see Japanese Patent No. 5415195). With that method, however, not only napped fibers are absent on the surface, but also the air permeability is low, leading to the problem of poor quality and comfortability.

For artificial full grain leather materials, there are ones including a leather sheet with good grip property having a base and a full grain part formed thereon that is composed of a coat layer and an outer layer containing decorative hollow nanosilica particles and a polymeric elastomer (see Japanese Patent No. 5452477) and a synthetic leather with high wear resistance that is composed of two polyurethane adhesive layers laminated on the surface of a fiber base (see Japanese Patent No. 3133957). In all those publications, however, the products fail to have napped fibers on the surface to show the lighting effect characteristic of nubuck leather and in addition, they are low in air permeability, leading to the problem of poor quality and comfortability.

It could therefore be helpful to provide a leather-like fabric that is an artificial leather including ultrafine fibers and a polymeric elastomer that has a feel of natural nubuck leather and a napped feel and air permeability of suede leather, as well as high wear resistance.

SUMMARY

We thus provide:

A leather-like fabric which is a fibrous structure including ultrafine fibers having an average monofilament fineness of 0.0001 dtex or more and 0.5 dtex or less, at least one surface of the fibrous structure being napped, the napped surface having resin layers located discontinuously, and each resin layer having two or more layers.

The term "discontinuous resin layers" used herein suggests that resin layers formed on the fabric surface are discontinuously arranged over the surface. More specifically, resin portions and napped portions are arranged discontinuously on the leather-like fabric, with the napped portions being interspersed among the resin portions dotted like islands in the outer layer, or with the resin portions being interspersed among the napped portion dotted like islands in the outer layer.

In the fabric surface, the discontinuous resin portions preferably account for 10% to 90% and more preferably 20% to 80% (by area). The fabric will be not only inferior in wear resistance, but also unlikely to have a nubuck-like surface touch and feel if the proportion of the discontinuous resin portions is less than 10%, whereas it will fail to have suede-like air permeability and a napped feel will be difficult to achieve if the proportion of the discontinuous resin portions is more than 90%.

Each of the resin layers may have a three-layer structure containing an adhesive layer, an interlayer, and an outer layer.

The resin layers may have a total thickness of 0.001 to 0.400 mm.

The fabric, subjected to air permeability evaluation, may have an air permeability of 1.0 $cm^3/cm^2 \cdot s$ or more as determined by the Frazier method specified in JIS L 1096 8.26.1.

The fabric, subjected to wear resistance evaluation, may be rated as class 3 or higher in terms of appearance deterioration after 1,000 abrasion cycles in Taber abrasion test specified in ASTM D3884.

The fabric, subjected to friction coefficient evaluation, may have a friction coefficient of 0.6 or less between fabric surfaces as measured by the KES-SE method.

The fibrous structure may be artificial leather having a polymeric elastomer contained in the structure.

The fibrous structure may be artificial leather having a woven/knitted material contained in the structure.

The fabric may have an elongation percentage of 15% or more and 35% or less in the warp direction and/or weft direction and an elongation recovery rate 70% or more and 100% or less in the warp direction and/or weft direction.

We provide a leather-like fabric having a feel resembling that of natural nubuck leather and a napped feel and air permeability of suede leather, as well as high wear resistance.

DETAILED DESCRIPTION

Our leather-like fabric is a fibrous structure including ultrafine fibers having an average monofilament fineness of 0.0001 dtex or more and 0.5 dtex or less, at least one surface of the fibrous structure being napped, the napped surface having resin layers located discontinuously, and each resin layer containing two or more layers.

The leather-like fabric contains ultrafine fibers having an average monofilament fineness of 0.0001 dtex or more and 0.5 dtex or less, as described above. The monofilament fineness of the ultrafine fibers is preferably 0.001 dtex or more and 0.3 dtex or less.

The leather-like fabric deteriorates in strength if the monofilament fineness is less than 0.0001 dtex. If the monofilament fineness is more than 0.5 dtex, on the other hand, the texture will stiffen and a delicate nap will be difficult to form, leading to poor surface quality, and when the fibrous structure is a nonwoven fabric, fibers will not be entangled to a sufficient degree, leading to problems such as decreased wear resistance.

To determine the monofilament fineness, 100 fiber cross sections are selected at random mainly from the fibers existing on the fabric surface or in the layer in which ultrafine fibers and a polymeric elastomer coexist, and then 100 fiber cross section measurements are taken, followed by calculating the fineness based on the specific gravity of the fibers. The specific gravity of the fibers to be used herein is determined according to JIS L 1015 8.14.2 (1999).

The fibrous structure may be in the form of a woven fabric, knitted fabric, nonwoven fabric, or artificial leather produced by filling such a structure with a polymeric elastomer, and it is preferable to adopt an appropriate one to suit the cost and characteristics requirements for particular applications. The use of woven fabric or knitted fabric is preferred to reduce the cost whereas the use of nonwoven fabric or artificial leather is preferred to ensure high quality with a dense texture or fine napping.

Examples of such knitted fabric include plain, twill, and satin fabrics, and various other woven fabrics based on such woven structures. Examples of such knitted fabric include fabrics produced by warp knitting, weft knitting (such as tricot), or lace making, and various other knitted fabrics based on those knitted structures.

Examples of such nonwoven fabric include general type short fiber or long fiber nonwoven fabrics, needle-punched nonwoven fabrics, sheet-like nonwoven fabrics, spunbond nonwoven fabrics, melt-blown nonwoven fabrics, electrospun nonwoven fabrics, and all other types of nonwoven fabrics designed for use in various categories. The use of nonwoven fabric is preferred to achieve high quality with a dense texture or fine napping, but artificial leather produced by filling such a structure with a polymeric elastomer is more preferred because of higher durability and surface wear resistance of the fabrics.

When using artificial leather, it is preferable for its structure to contain reinforcing cloth of woven/knitted fabric to ensure high mechanical strength, and it is preferable for the woven/knitted fabric to be formed of stretchable fiber to ensure high handleability and moldability.

In the fibrous structure, at least one surface should be napped. The existence of a napped surface serves to ensure good adhesion to resin layers in subsequent steps and the exposure of napped fibers at the fabric surface ensures a surface feel resembling that of real leather.

Furthermore, the napped surface has resin layers located discontinuously, and each resin layer contains two or more layers. It is preferable for the resin layer to have a three-layer structure containing an adhesive layer, an interlayer, and an outer layer.

The discontinuous formation of resin layers allows the non-resin portions to keep an adequate air permeability in the leather-like fabric and prevent the resin layers from suffering from cracks when the fabric is folded, thus serving to maintain good quality and texture. Furthermore, the two or more layered structure of each resin layer makes it possible to produce a leather-like fabric that has high wear resistance to serve for applications such as automobile sheets and sofas that require durability. The wear resistance will be poor if the resin layer has only one or less layer.

The resin layer preferably has a total thickness of 0.001 to 0.400 mm. The wear resistance tends to be low if the total thickness is less than 0.001 whereas the texture will be stiff if the total thickness is more than 0.400 mm. The total thickness is more preferably 0.01 to 0.100 mm.

Regarding the thickness of each layer in the resin layer, the first layer and the second layer preferably have a thickness of 0.001 to 0.02 mm whereas the third preferably has a thickness of 0.008 to 0.06 mm. Furthermore, the thickness of the first layer and the second layer is preferably less than 0.065 mm or so whereas that of the third is preferably less than 0.25 mm or so.

Preferable examples of the ultrafine fibers that constitute the leather-like fabric and fibers used for reinforcing cloth include synthetic fibers of thermoplastic resins such as polyester, polyamide, polypropylene, and polyethylene.

Described in detail below is an example that uses a sea-island type fiber as ultrafine fiber-generating fiber to form artificial leather to be used as leather-like fabric. Ultrafine fibers usable to constitute the artificial leather can be produced from an ultrafine fiber-generating fiber containing two or more polymeric substances having different solubilities in a solvent.

Examples of such ultrafine fiber-generating fibers include sea-island type composite fibers formed of two types of thermoplastic resins having different solubilities in a solvent and acting as the sea and island components, from which the sea component is removed with the solvent to produce an ultrafine fiber formed of the island component; and splittable composite fibers formed of two types of thermoplastic resins alternately arranged in a radial or multi-layer manner in the fiber surface, which are treated with a solvent to split and separate it to provide an ultrafine fiber. Of these, preferred in view of softness and texture of the fiber structure are sea-island type composite fibers since adequate gaps can be produced among the island component regions, that is, among the ultrafine fibers in the interior of the fiber bundles, by removing the sea component.

Such sea-island type composite fibers can be produced by the mutually aligned polymer spinning method in which two components, namely, the sea component and the island component, are spun in an aligned manner by using a sea-island type spinneret or by the blend spinning method in which two components, namely, the sea component and the island component, are spun as a mixture. The use of a sea-island type composite fiber produced by the mutually aligned polymer spinning method is preferred in view of obtaining ultrafine fibers having a uniform fineness.

Useful materials for the island component of the sea-island type composite fiber, namely, ultrafine fibers constituting a fiber structure that can be obtained by the fiber structure production method, include various synthetic fibers formed of polymers including polyesters such as polyethylene terephthalate, polybutylene terephthalate, polytrimethylene terephthalate, and polyethylene-2,6-naphthalene dicarboxylate; polyamides such as 6-nylon and 66-nylon, and others such as acrylic polyethylene and polypropylene.

Of these, preferred for use here are polyester fibers containing polymers such as polyethylene terephthalate, polybutylene terephthalate, and polytrimethylene terephthalate in view of the excellent properties including strength, size stability, light resistance, and dyeability. The fiber structure may contain ultrafine fibers of different materials mixed together to an extent not impairing the desired effect.

The polymer used to form the island component may contain inorganic particles such as titanium oxide, lubricant, pigment, heat stabilizer, UV absorber, electroconductive agent, heat storage agent, and/or antibiotic, which may be added to meet the intended applications.

As for the cross-sectional shape of the ultrafine fibers, a circular cross section can be suitable, but other useful irregular shapes include ellipse, flat shape, polygons such as triangle, sector, or cross.

Preferably, the ultrafine fibers in the fiber structure are in the form of a nonwoven fabric (a web of ultrafine fibers). Such a nonwoven fabric can serve to achieve a uniform, elegant appearance and texture. The non-woven fabric (a web of ultrafine fibers) may be either a short-fiber nonwoven fabric or a long-fiber nonwoven fabric, but the use of a short-fiber nonwoven fabric is preferred when importance is placed on texture and quality.

If a short fiber nonwoven fabric is to be used, the ultrafine fibers contained preferably have a fiber length of 25 mm or more and 90 mm or less. Controlling the fiber length of the ultrafine fibers at 90 mm or less ensures high quality and good texture while controlling the fiber length at 25 mm or more serves to obtain a fiber structure with high wear resistance.

The resulting ultrafine fiber-generating fibers are preferably subjected to crimping treatment and cut to a predetermined length to provide a raw stock for nonwoven fabrics. The ultrafine fiber-generating fibers may be used for a long fiber nonwoven fabric without cutting, but it is preferable to cut them to a predetermined length to provide a short fiber nonwoven fabric when good texture and high quality are required. When texture and quality are important, it is preferable for the short fibers to have a fiber length of 25 mm or more and 90 mm or less taking into consideration the effect of their entanglement on the wear resistance.

Generally known methods may be used for the crimping and cutting steps. The raw stock may be processed into a fiber web by a cross lapper and the resulting fiber web may be entangled with a woven/knitted fabric.

The weight of the fiber web may be appropriately set after considering the design of the final product, size alteration in the subsequent steps, and performance of the processing machine.

Useful production methods for our artificial leather include the step of entangling a woven/knitted fabric and an entangled fiber mass (fiber web) formed of ultrafine fiber-generating fibers to produce a layered sheet composed mainly of an unwoven fabric formed of ultrafine fiber-generating fibers and a woven/knitted fabric. The methods usable for entangling them include needle punching and water jet punching. Of these, the use of needle punching for entangling them is preferred in view of adhesion workability and product quality.

With respect to the woven/knitted fabric, it is preferable to use a shrinkable woven/knitted fabric. The shrinkage treatment of the woven/knitted fabric may be realized by any of heat treatment, treatment with a chemical agent or solvent, mechanical treatment, and other types of treatment. In view of the productivity, it is preferable to adopt heat treatment as the method for the shrinkage treatment of the woven/knitted fabric.

Entanglement of the fiber structure (fiber web) formed of ultrafine fiber-generating fibers and the woven/knitted fabric can be accomplished by different methods including a method in which a woven/knitted fabric is laminated on an entangled fiber mass, a method in which an entangled fiber mass is sandwiched between two woven/knitted fabric layers, and a method in which a woven/knitted fabric is sandwiched between two fiber entangled masses. In view of workability and efficiency, it is preferable to adopt the method in which an entangled fiber mass is sandwiched between two woven/knitted fabric layers.

The woven/knitted fabric that works as reinforcing cloth in the leather-like fabric to be used is laminated and integrated with an entangled fiber mass such as nonwoven fabric of ultrafine fiber-generating fibers. When the needle punching technique is used for the laminating step, the woven/knitted fabric may be sometimes broken by the needle, depending on the type of the yarn, and a decrease in the strength of the artificial leather may be caused accordingly. As a means of suppressing this, the type of the yarn used in the woven/knitted fabric is preferably a twisted yarn.

When the yarn constituting the woven/knitted fabric has a total fineness (total fineness in a multifilament) of 200 dtex or more, the woven/knitted fabric will have an excessively large weight, leading to an artificial leather having an excessively large weight. This will work to increase the rigidity of the woven/knitted fabric, and it will be difficult to achieve a sufficiently high softness required in an artificial leather. The yarn constituting the woven/knitted fabric preferably has a total fineness of 30 dtex or more and 150 dtex or less, and more preferably 50 dtex or more and 130 dtex or less, in view of rigidity, weight and the like.

The yarn constituting the woven/knitted fabric may have an average monofilament fineness of 1 dtex or more and 10 dtex or less. Also usable are ultrafine fibers having a monofilament fineness of 0.001 dtex or more and 1 dtex or less.

The yarn constituting the woven/knitted fabric preferably may be of a synthetic fiber such as polyester, polyamide, polyethylene, polypropylene, and a copolymer thereof. Of these, it is preferable to use synthetic fibers of polyester, polyamide, or a copolymer thereof, which may be used alone or as a composite or mixture thereof. A candidate yarn for constituting a woven/knitted fabric may be in the form of filament yarn, spun yarn, and mixed yarn of filaments and short fibers.

The woven/knitted fabric may be a woven/knitted fabric containing composite fibers in which two or more polymers are combined in the form of side-by-side or eccentric-core-shell composite fiber (hereinafter occasionally referred to as "composite fiber of side-by-side type or other type"). For example, in a composite fiber of side-by-side type or other type containing two or more polymers having different intrinsic viscosities (IV), different inner strains are generated in the two components by the stress concentrated on the high viscosity side during elongation. Because of this inner strain, the high viscosity component will experience larger shrinkage due to a difference in the elastic recovery after the elongation and a difference in heat shrinkage in the heat treatment step, and the strain caused in monofilaments will result in crimping in the form of a three dimensional coil. This three dimensional coil type crimping acts to generate stretchability in the resulting artificial leather.

Examples of such woven fabrics include plain, twill, satin fabrics, and various other woven fabrics based on woven structures thereof. Examples of such knitted fabrics include those produced by warp knitting, weft knitting (such as tricot), or lace making, and various other knitted fabrics based on knitted structures thereof. Of these, woven fabrics are preferable in view of workability, and plain weave fabrics are particularly preferable in view of cost. A woven fabric having an appropriate weaving density may be selected in consideration of the total density of the yarn and the undermentioned installations and conditions used for entangling a nonwoven fabric with a woven/knitted fabric.

A water-soluble resin may be added as required to such a woven/knitted fabric.

If a water-soluble resin is added to the woven/knitted fabric, the surface of the yarn constituting the woven/knitted fabric is protected by the water-soluble resin, and the parts where the yarn is in direct contact with the polymeric elastomer on the surface of the yarn constituting the woven/knitted fabric will be scattered in a discontinuous, instead of continuous, manner, thus making it possible to control the size of the adhesion area. This enables the production of an artificial leather having a soft texture while retaining a required strength and size stability as a result of adequate adhesion. If a woven/knitted fabric is formed of a side-by-side type composite fiber, on the other hand, it will be possible to obtain an artificial leather having a high stretchability.

Examples of the water-soluble resin include polyvinyl alcohol, polyethylene glycol, saccharide, and starch. Of these, it is preferable to use polyvinyl alcohols having a saponification degree of 80% or more.

A typical method usable for adding such a water-soluble resin to a woven/knitted fabric is to impregnate the woven/knitted fabric with an aqueous solution of the water-soluble resin, followed by drying. The water-soluble resin added to the woven/knitted fabric can be removed by using hot water or the like after adding a polymeric elastomer as described below.

In the production method of the artificial leather, the woven/knitted fabric obtained in the above step and the fiber structure formed of ultrafine fiber-generating fibers of two or more polymeric substances having different solubilities in the solvent are entangled for integration in to into a laminated sheet.

The laminated sheet thus obtained that contains an entangled fiber mass of ultrafine fiber-generating fibers together with a woven/knitted fabric, is preferably shrunk by dry heating and/or wet heating for further densification before the addition of a polymeric elastomer to increase the density. While this shrinking step may be conducted either before or after generation of ultrafine fibers, the shrinking step is preferably conducted before the generation of ultrafine fibers in view of making effective use of the characteristics of the sea component polymer in the ultrafine fiber-generating fibers.

The areal shrinkage rate of the laminated sheet in this shrinking step is preferably 15% or more and less than 35%. When the areal shrinkage rate is 10% or more, the effect of improving the quality shrinkage will be realized favorably by the shrinkage. When the areal shrinkage rate is less than 35%, the woven/knitted fabric integrated with the nonwoven fabric will still be capable of undergoing further shrinkage, and effective shrinking can still be conducted after adding a polymeric elastomer. The areal shrinkage rate is more preferably 13% or more and less than 30%, and still more preferably 15% or more and less than 25%.

The production method for an artificial leather to serve as the leather-like fabric includes the step of treating the aforementioned laminated sheet composed mainly of an entangled fiber mass (nonwoven fabric) containing ultrafine fiber-generating fibers together with a woven/knitted fabric to generate ultrafine fibers having an average monofilament fineness of 0.01 to 0.50 dtex. One method usable to generate ultrafine fibers is to use a solvent to dissolve one of the resins in the ultrafine fiber-generating fibers. A particularly preferable method is to dissolve the sea component out of an ultrafine fiber-generating sea-island composite fiber composed mainly of a sea component of a readily soluble polymer and an island component of a slightly soluble polymer.

The solvent used for dissolution of the sea component is ordinarily an organic solvent such as toluene and trichloroethylene when the sea component is a polyolefin such as polyethylene and polystyrene. An aqueous solution of an alkali such as sodium hydroxide may be used when the sea component is of a polylactic acid or a copolymeric polyester. This processing of ultrafine fiber generation (sea component removal treatment) may be accomplished by immersing an entangled fiber mass that can be processed into ultrafine fibers in a solvent and squeezing the liquid.

Subsequently, a polymeric elastomer is added to the resulting entangled fiber mass containing ultrafine fibers. The artificial leather contains a polymeric elastomer. Incorporation of such a polymeric elastomer enables the realization of a dense texture, leather-like appearance, and physical properties suitable for practical uses.

An elastic polymer is a stretchable polymeric compound having rubber elasticity and its examples include polyurethane, SBR, NBR, and acrylic resin. Of these, polymeric elastomers containing polyurethane as main component are preferable in view of achieving a good balance between texture and physical properties, and more specifically, polymeric elastomers having a polyurethane content of 50% or more by weight are preferable.

There are various types of polyurethane including organic solvent-soluble ones that are used in a state of being dissolved in an organic solvent and water-dispersible ones that are used in a state of being dispersed in water, both of which can work.

The polyurethane may be a polyurethane having a structure obtained by suitably reacting a polyol, a polyisocyanate, and a chain extender.

Examples of the polyol include polycarbonate based diols, polyester based diols, polyether based diols, silicone based diols, fluorine based diols, and copolymers produced through combination thereof. Of these, the use of a polycarbonate based diol or a polyester based diol is preferable in view of light resistance. The use of a polycarbonate based diol is also preferable in view of hydrolytic resistance and heat resistance.

A polycarbonate based diol can be produced through, for example, an ester exchange reaction between alkylene glycol and carbonate or through a reaction of phosgene or a chloroformate with alkylene glycol.

For example, useful alkylene glycols include linear alkylene glycols such as ethylene glycol, propylene glycol, 1,4-butane diol, 1,5-pentane diol, 1,6-hexane diol, 1,9-nonane diol, and 1,10-decane diol; branched alkylene glycols such as neopentyl glycol, 3-methyl-1,5-pentane diol, 2,4-diethyl-1,5-pentane diol, and 2-methyl-1,8-octane diol; alicyclic diols such as 1,4-cyclohexane diol; aromatic diols such as bisphenol A; and others such as glycerin, trimethylol propane, and pentaerythritol.

Each of these diols may be either a polycarbonate diol produced from a single alkylene glycol or a copolymerized polycarbonate diol produced from two or more types of alkylene glycols.

For example, usable polyisocyanates include aliphatic polyisocyanates such as hexamethylene diisocyanate, dicyclohexylmethane diisocyanate, isophorone diisocyanate, and xylylene diisocyanate; and aromatic polyisocyanates such as diphenylmethane diisocyanate and tolylene diisocyanate, which may be used in combination. In particular, the use of aromatic polyisocyanates such as diphenylmethane diisocyanate is preferred when durability and heat resistance are important while the use of aliphatic polyisocyanates such as hexamethylene diisocyanate, dicyclohexylmethane diisocyanate, and isophorone diisocyanate is preferred when light resistance is important.

Examples of the chain extender include amine based chain extenders such as ethylene diamine and methylene bisaniline, diol based chain extenders such as ethylene glycol, and polyamine compounds obtained by reacting polyisocyanate with water.

Any elastic polymer may contain elastomer resins such as polyester based, polyamide based, and polyolefin based ones, acrylic resins, and ethylene-vinyl acetate resins unless they impair the texture or performance when used as binder.

Furthermore, the elastic polymer may contain various additives including pigments such as carbon black; flame retarders such as phosphorus based, halogen based, and inorganic ones; antioxidants such as phenol based, sulfur based, and phosphorus based ones; ultraviolet light absorbers such as benzotriazole-based, benzophenone-based, salicylate-based, cyanoacrylate-based, and oxalic acid anilide based ones; light stabilizers such as hindered amine based and benzoate based ones; hydrolysis resistant stabilizers such as polycarbodiimide; and others such as plasticizers, antistatic agents, surfactants, solidification adjusting agents, and dyes.

The content of the elastic polymer can be adjusted appropriately considering the type, production method, and texture of the polymeric elastomer used.

The treatment to generate ultrafine fibers from the ultrafine fiber-generating fiber may be either preceded or followed by the treatment to add a polymeric elastomer. When the treatment to generate ultrafine fibers is carried out first, the polymeric elastomer will grasp the ultrafine fibers and removal of the ultrafine fibers is thereby prevented, which will enable production of a product that can be used for a longer period. On the other hand, when addition of a polymeric elastomer is conducted first, the ultrafine fibers will not be structurally held by the polymeric elastomer, and the resulting artificial leather will have a good texture. The order of these treatments may be appropriately selected to meet the type of polyurethane and the like used.

When the addition of a polymeric elastomer is conducted after the treatment that generates ultrafine fibers, a step of adding a water-soluble resin is preferably carried out between the two steps. By including such a step of adding a water-soluble resin, the surfaces of the fibers constituting the fiber bundles of ultrafine fibers and those constituting the woven/knitted fabric will be protected by the water-soluble resin, and the surface regions where the fibers are in contact with the polymeric elastomer will be located continuously, instead of continuously, on the surfaces of the fibers constituting the fiber bundles of ultrafine fibers and those constituting the woven/knitted fabric, thus serving to maintain appropriate adhesion areas. As a consequence, the resulting artificial leather will have a good texture and good grip feeling realized by the polymeric elastomer, and it will also have a high stretchability if a woven/knitted fabric of composite fiber such as of side-by-side type is adopted.

Examples of such water-soluble resins include polyvinyl alcohol, polyethylene glycol, saccharide, and starch. Of these, it is preferable to use polyvinyl alcohol having a saponification degree of 80% or more.

A useful method of adding a water-soluble resin to an entangled fiber mass is to impregnate the entangled fiber mass with an aqueous solution of the water-soluble resin, followed by drying. With respect to the drying conditions including drying temperature and drying time, it is preferable for the temperature of the entangled fiber mass itself that contains a water-soluble resin to be maintained at a 110° C. or less from the viewpoint of suppressing the shrinkage of the woven/knitted fabric.

The amount of the water-soluble resin to be added is preferably 1% to 30% by weight relative to the weight of the entangled fiber mass immediately before the addition. An addition to 1 mass % or more ensures a good texture, and it also ensures a high stretchability if a woven/knitted fabric of composite fiber such as of side-by-side type is adopted. At the same time, an addition to 30% by weight or less will lead to good workability and allow the production of an artificial leather exhibiting good physical properties including wear resistance. Such a quantity also allows an increased amount of the polymeric elastomer to be added to the entangled fiber mass in a subsequent step, and the resulting artificial leather will have a high density and a dense texture.

A preferable production method for an artificial leather is to combine an entangled fiber mass (nonwoven fabric) of ultrafine fibers to serve as precursor and a woven/knitted fabric to provide a laminated sheet (a fiber structure) and add a polymeric elastomer thereto, followed by coagulation and shrinking treatment.

For production of an artificial leather, the technique in which a laminated sheet that is a non-woven fabric (i.e., precursor) laminated as required with a woven/knitted fabric is shrunk before the addition of a polymeric elastomer has been known as a method of achieving improved quality. An artificial leather having a nap produced though a process that includes a step of shrinking a non-woven fabric generally enjoys improved quality due to an increased nap density.

The production method for an artificial leather may include a step in which the artificial leather precursor sheet containing a polymeric elastomer added thereto may be cut in half in the plane direction. Productivity of the artificial leather can be improved by incorporating such a cut-in-half step. For example, when the method of sandwiching a nonwoven fabric layer of ultrafine fiber-generating fibers between woven/knitted fabric layers is employed in order to laminate the woven/knitted fabric, it is preferable to cut the precursor sheet in half and nap the inner surfaces as a means of realizing a dense quality.

Any artificial leather herein has a nap at least on one surface. Napping is performed on the surface of the nonwoven fabric. The napping treatment can be accomplished by buffing a nonwoven fabric surface with sandpaper or roll sander. In particular, the use of sandpaper allows a uniform, dense nap to be formed. To form a uniform nap over the surface of artificial leather, the use of a small grinding load is preferable.

The artificial leather can be dyed favorably. It is preferable for its dyeing to be conducted by using a disperse dye, cationic dye, or other type of reactive dye and using a high-temperature, high-pressure dyeing machine to allow the dyed artificial leather substrate sheet to have a soft texture.

If required, furthermore, it may be subjected to finishing treatment steps using a softening agent such as silicone, antistatic agent, water repellent agent, flame retardant agent, light resisting agent and the like, and such finishing treatment steps may be conducted either after the dyeing or in the same bath that is used for the dyeing. The flame retardant treatment may be accomplished by using a halogen based flame retardant such as bromine or chlorine flame retardant, or a non-halogen flame retardant such as phosphorus flame retardant, and the treatment may be conducted by immersion after the dyeing step or by back-coating techniques such as knife coating and rotary screen printing.

The artificial leather has discontinuous resin layers formed on its napped surface and each of the resin layers has a layered structure having two or more layers. Furthermore, it is more preferable for the resin layer to have a three-layer structure having an adhesive layer, an interlayer, and an outer layer. The adhesive layer functions for adhesion between the leather-like fabric and the interlayer and between the outer layer and the resin layer.

There are no specific limitations on the method to be used to form a resin layer as long as it can serve for discontinuous coating of the surface of a fibrous structure designed for use as fabric. Available coating methods include, for example, producing a resin layer by performing a screen coating technique using a flat screen, rotary screen and the like, or a gravure coating technique followed by drying, and producing a resin layer by forming a discontinuous resin film on a support base of release paper and the like, coating the surface of the resin film with an adhesive, bonding it to the surface that serves as base, and peeling off the release paper.

Furthermore, a two-layer or three-layer resin layer can be produced by repeating a technique as described above twice or three times. It may be effective to repeat one of the techniques several times or to use two or more different techniques in combination.

The resin used to form a resin layer is a stretchable polymeric compound having rubber elasticity and its examples include polyurethane, SBR, NBR, and acrylic resin. Of these, polymeric elastomers containing polyurethane as main component are preferable in view of achieving a good balance between texture and physical properties, and more specifically, polymeric elastomers having a polyurethane content of 50% or more by weight are preferable.

There are various types of polyurethane including organic solvent-soluble ones used in a state of being dissolved in an organic solvent and water-dispersible ones that are used in a state of being dispersed in water, both of which can work.

It is preferable furthermore to use a polyurethane layer as the resin layer for lamination. A polyether based or polyester based polyurethane, which is high in adhesiveness, is preferably used in the first layer, which serves as adhesive layer, and a polycarbonate based polyurethane, which is high in durability, is preferably used in the second and other layers.

The polyurethane may be a polyurethane having a structure obtained by suitably reacting a polyol, a polyisocyanate, and a chain extender.

Examples of the polyol include polycarbonate based diols, polyester based diols, polyether based diols, silicone based diols, fluorine based diols, and copolymers produced through combination thereof. Of these, the use of a polycarbonate based diol or a polyester based diol is preferable in view of light resistance. Furthermore, the use of a polycarbonate based diol is preferable from the viewpoint of hydrolysis resistance and heat resistance, but in the adhesive layer, the use of a polyether based diol or polyester based diol is preferable from the viewpoint of the adhesion with a fabric surface.

A polycarbonate based diol can be produced through, for example, an ester exchange reaction between alkylene glycol and carbonate or through a reaction of phosgene or a chloroformate with alkylene glycol.

For example, useful alkylene glycols include linear alkylene glycols such as ethylene glycol, propylene glycol, 1,4-butane diol, 1,5-pentane diol, 1,6-hexane diol, 1,9-nonane diol, and 1,10-decane diol; branched alkylene glycols such as neopentyl glycol, 3-methyl-1,5-pentane diol, 2,4-diethyl-1,5-pentane diol, and 2-methyl-1,8-octane diol; alicyclic diols such as 1,4-cyclohexane diol; aromatic diols such as bisphenol A; and others such as glycerin, trimethylol propane, and pentaerythritol.

Each of these diols may be either a polycarbonate diol produced from a single alkylene glycol or a copolymerized polycarbonate diol produced from two or more types of alkylene glycols.

For example, usable polyisocyanates include aliphatic polyisocyanates such as hexamethylene diisocyanate, dicyclohexylmethane diisocyanate, isophorone diisocyanate, and xylylene diisocyanate; and aromatic polyisocyanates such as diphenylmethane diisocyanate and tolylene diisocyanate, which may be used in combination. In particular, the use of aromatic polyisocyanates such as diphenylmethane diisocyanate is preferred when durability and heat resistance are important while the use of aliphatic polyisocyanates such as hexamethylene diisocyanate, dicyclohexylmethane diisocyanate, and isophorone diisocyanate is preferred when light resistance is important.

Examples of the chain extender include amine based chain extenders such as ethylene diamine and methylene bisaniline, diol based chain extenders such as ethylene glycol, and polyamine compounds obtained by reacting polyisocyanate with water.

Any resin used in the resin layer may contain elastomer resins such as polyester based, polyamide based, and polyolefin based ones, acrylic resins, and ethylene-vinyl acetate resins unless they impair the wear resistance or texture. Furthermore, these resins may contain various additives including pigments such as carbon black; flame retarders such as phosphorus based, halogen based, and inorganic ones; antioxidants such as phenol based, sulfur based, and phosphorus based ones; ultraviolet light absorbers such as benzotriazole-based, benzophenone-based, salicylate-based, cyanoacrylate-based, and oxalic acid anilide based ones; light stabilizers such as hindered amine based and benzoate based ones; hydrolysis resistant stabilizers such as polycarbodiimide; and others such as plasticizers, antistatic agents, surfactants, solidification adjusting agents, and dyes.

The leather-like fabric produced as described above has a feel of natural nubuck leather and a napped feel and air permeability of suede leather, as well as high wear resistance, and can serve for a wide variety of applications including furniture, chains, and vehicle interior finishing materials, and garments, for which artificial suede-like leather has been used conventionally.

EXAMPLES

Our leather-like fabric will now be illustrated in greater detail with reference to Examples.
Measuring Methods and Processing Methods for Evaluation
(1) Total Thickness of Resin Layer at Leather-Like Fabric Surface:

A leather-like fabric sample was cut in the direction perpendicular to the plane and machine directions to provide a specimen, which was then placed on the sample stage while eliminating deformation. Then, using a scanning electron microscope (SEM, VE-7800, manufactured by Keyence Corporation), the cross section of the leather-like fabric specimen was observed at a magnification of ×200 and 10 photographs were taken from different positions. Assuming that in each photograph, the parallel direction to the cross section is the horizontal direction and that the napped layer side and the other side of the cross section are the upper side and the lower side, respectively, observation was performed to measure the two-point distance between the highest position z1 of the resin layer and the lowest position z2 of the resin layer, followed by calculating the total thickness of the resin layer. Thus, 10 calculated values were obtained and their average was adopted as the total thickness of the resin layer.

(2) Air Permeability Evaluation for Leather-Like Fabrics:

For each leather-like fabric sample to be examined, a 200 mm×200 mm test piece was taken from five different positions and subjected to measurement according to JIS L 1096 (2015) 8.26.1 using the Frazier method, followed by calculating the quantity of air ($cm^3/cm^2 \cdot s$) passing through the test piece based on the conversion table attached to the test apparatus. The five calculations thus obtained were averaged to give a value to be adopted as the air permeability ($cm^3/cm^2 \cdot s$).

(3) Wear Resistance Evaluation for Leather-Like Fabrics:

For each leather-like fabric sample to be examined, a circular test piece with a diameter of 120 mm was taken from an appropriate position and tested by the Taber abrasion test specified in ASTM D3884 6.1 using a CS #10 wear ring under the conditions of 1,000 cycles at 4.9 N. Then, the worn state of the surface of the leather-like fabric was observed and compared with the state of the surface seen before the test, and the test piece was classified according to the damage criteria described below. For this evaluation, a test piece rated as class 3 to 5 was judged as acceptable.
Class 5: No damage is found.
Class 4: Small damage is found, but almost invisible.
Class 3: Damage is clearly found, but not significantly visible.
Class 2: Significant damage is found.
Class 1: Serious damage is found.

(4) Friction Coefficient Evaluation for Leather-Like Fabrics:

Measurements were taken by KES-SE manufactured by Kato Tech Co., Ltd., which is deigned to determine the friction coefficient between test pieces of leather-like fabrics. Specifically, a 4 cm×4 cm test piece and a 6 cm×12 cm test piece were attached to the upper specimen table and the lower specimen table, respectively, and the lower specimen table was moved at a speed of 1 mm/second while the frictional force was detected by a friction block connected to a sensor and recorded on a chart as wave form data. The average friction coefficient (MIU) was read from the data. For each sample, measurements were taken in two, namely warp and weft, directions, and the average of the two values was calculated.

(5) Stretchability Evaluation for Leather-Like Fabrics:

For each leather-like fabric sample that has a fibrous structure containing reinforcing cloth in the form of stretchable woven/knitted fabric inside the structure, the elongation percentage and the elongation recovery rate were measured to examine the stretchability of the fabric.

Elongation Percentage

The elongation percentage (%) of each leather-like fabric sample was measured by Method B (constant load method) specified in JIS L 1096 (2015) 8.14.1. Here, the clamp-to-clamp distance was 50 cm. The favorable range of the elongation percentage is 15% or more and 35% or less.

Elongation Recovery Rate

The elongation recovery rate (%) of each leather-like fabric sample was measured by Method B-1 (constant load method) specified in JIS L 1096 (2015) 8.14.2. Here, the clamp-to-clamp distance was 50 cm, and the specimen was left to stand for one hour after removing the load. The favorable range of the elongation recovery rate is 70% or more and 100% or less.

(6) Surface Feel Evaluation for Leather-Like Fabric:

Evaluation was performed based on sensory test by 10 testers. A test piece was given a double circle, single circle, triangle, or ×, when 8 or more, 5 to 7, 3 or 4, or 2 or less testers, respectively, judged that it had a nubuck-like dense, wet feel to the touch. A sample given a double circle or a single circle was judged as acceptable. According to these criteria, a test piece having a natural nubuck-like feel is given a high rating.

(7) Surface Napped Feel Evaluation for Leather-Like Fabric:

Evaluation was performed based on sensory test by 10 testers. A test piece was given a double circle, single circle, triangle, or ×, when 8 or more, 5 to 7, 3 or 4, or 2 or less testers, respectively, judged that it had a suede-like napped feel to the touch. A sample given a double circle or a single circle was judged as acceptable. According to these criteria, a test piece having a natural suede-like feel is given a high rating.

Example 1

Raw Stock

Polyethylene terephthalate used as island component and polystyrene used as sea component were melt-spun through a spinneret designed for 16-island sea-island type composite fiber with an island/sea mass ratio of 80/20, followed by stretching, crimping, and subsequent cutting to a 51 mm length to prepare raw stock of sea-island type composite fiber with a monofilament fineness of 3.8 dtex.

Entangled Mass Composed of Nonwoven Fabric and Woven/Knitted Fabric (Laminated Sheet)

The above raw stock of sea-island type composite fiber was processed by carding and crosslapping to provide a laminated web, which was then needle-punched at a punching rate of 100 punches/$cm^2$ so that the woven fabric would not suffer from creasing due to rapid changes in width when attaching a woven fabric. Elsewhere, a multifilament (84 dtex, 72 filaments) with a twist count of 2,500 T/m composed of monocomponent filaments with an intrinsic viscosity (IV) of 0.65 was used as weft while a multifilament (84 dtex, 72 filaments) with a twist count of 2,500 T/m composed of monocomponent filaments with an intrinsic viscosity (IV) of 0.65 was used as warp to produce a plain weave fabric having a weaving density of 97 warp yarns per 2.54 cm and 76 weft yarns per 2.54 cm. The resulting plain weave fabric was attached to the top and bottom sides of the laminated web.

Subsequently, needle punching was performed at a punching rate (density) of 2,500 punches/$cm^2$ to produce a laminated sheet composed of a heat-shrinkable woven fabric and a non-woven fabric of ultrafine fiber-generating type fibers having a weight of 740 g/$m^2$ and a thickness of 3.4 mm.

Artificial Leather

The laminated sheet prepared in the above step was shrunk by hot water treatment at a temperature of 96° C. and then impregnated with an aqueous solution of PVA (polyvinyl alcohol), followed by drying in hot air at a temperature of 110° C. for 10 minutes to provide a sheet base in which PVA accounted for 7.6 mass % relative to the mass of the laminated sheet. The laminated sheet thus obtained was immersed in trichloroethylene to dissolve and remove the sea component of polystyrene to provide a sea-free sheet in which ultrafine fibers with an average monofilament fineness of 0.20 dtex and a plain weave fabric are entangled. The resulting sea-free sheet composed of a nonwoven fabric of ultrafine fibers and a plain weave fabric was immersed in a solution of polyurethane in DMF (dimethyl formamide) with a solid content adjusted to 12%, followed by coagulating the polyurethane in an aqueous solution with a 30% DMF concentration. Subsequently, PVA and DMF were removed with hot water and dried in hot air at a temperature of 110° C. for 10 minutes to provide a precursor sheet for artificial leather in which polyurethane accounted for 27 mass % of the total mass of the ultrafine fibers of the island component and the plain weave fabric.

The precursor sheet for artificial leather thus produced was cut in half in the thickness direction, that is, the nonwoven fabric layer in the precursor sheet for artificial leather was cut in half in the perpendicular direction, and the half-cut sheet surface was ground with endless sandpaper with a sandpaper roughness number 320 to nap the surface layer, thereby providing artificial leather gray fabric with a thickness of 0.81 mm. The artificial leather gray fabric thus obtained was subjected to simultaneous shrinkage treatment and dyeing using a jet dyeing machine at a temperature of 120° C., followed by drying by a drying machine to provide artificial leather.

Formation of Resin Layers

The napped surface of the artificial leather obtained in the above step was subjected to rotary coating, which was repeated three times to form a three-layer polyurethane resin layer having a discontinuously coated surface. On the surface, resin layer portions are scattered like islands, and resin portions and napped portions are arranged discontinuously, with the resin portions accounting for 60% of the fabric surface. The leather-like fabric thus obtained had a feel of natural nubuck leather and a napped feel and air permeability of suede leather, as well as high wear resistance. Results are given in Table 1.

Example 2

Raw Stock

Polyethylene terephthalate used as island component and polystyrene used as sea component were melt-spun through a spinneret designed for 36-island sea-island type composite fiber with an island/sea mass ratio of 55/45, followed by stretching, crimping, and subsequent cutting to a 51 mm length to prepare raw stock of sea-island type composite fiber with a monofilament fineness of 3.1 dtex.

Entangled Mass Composed of Nonwoven Fabric and Woven/Knitted Fabric (Laminated Sheet)

The above raw stock of sea-island type composite fiber was processed by carding and crosslapping to provide a laminated web, which was then needle-punched at a punching rate of 100 punches/cm$^2$ so that the woven fabric would not suffer from creasing due to rapid changes in width when attaching a woven fabric. Elsewhere, a multifilament (56 dtex, 12 filaments) with a twist count of 1,500 T/m of side-by-side type composite yarns composed of a PET component with an intrinsic viscosity (IV) of 0.78 and a PET component with an intrinsic viscosity (IV) of 0.51 with a composite ratio (wt %) of 50:50 was used as weft while a multifilament (84 dtex, 72 filaments) with a twist count of 2,500 T/m of monocomponent filaments with an intrinsic viscosity (IV) of 0.65 was used as warp to produce a plain weave fabric with a weaving density of 69 warp yarns per 2.54 cm and 83 weft yarns per 2.54 cm. The resulting plain weave fabric was attached to the top and bottom sides of the laminated web described above.

Subsequently, needle punching was performed at a punching rate (density) of 2,500 punches/cm$^2$ to produce a laminated sheet composed of a heat-shrinkable woven fabric and a non-woven fabric of ultrafine fiber-generating type fibers having a weight of 560 g/m$^2$ and a thickness of 2.3 mm.

Artificial Leather

The laminated sheet prepared in the above step was shrunk by hot water treatment at a temperature of 96° C. and then impregnated with an aqueous solution of PVA (polyvinyl alcohol), followed by drying in hot air at a temperature of 110° C. for 10 minutes to provide a sheet base in which PVA accounted for 4.0 mass % relative to the mass of the laminated sheet. This laminated sheet was immersed in trichloroethylene to dissolve and remove the sea component of polystyrene to provide a sea-free sheet in which ultrafine fibers with an average monofilament fineness of 0.05 dtex and a plain weave fabric are entangled. The resulting sea-free sheet composed of a nonwoven fabric of ultrafine fibers and a plain weave fabric was immersed in a solution of polyurethane in DMF (dimethyl formamide) with a solid content adjusted to 12%, followed by coagulating the polyurethane in an aqueous solution with a 30% DMF concentration. Subsequently, PVA and DMF were removed with hot water and dried in hot air at a temperature of 110° C. for 10 minutes to provide a precursor sheet for artificial leather in which polyurethane accounted for 20 mass % of the total mass of the ultrafine fibers of the island component and the plain weave fabric.

The precursor sheet for artificial leather thus obtained was cut in half in the thickness direction, that is, the nonwoven fabric layer in the precursor sheet for artificial leather was cut in half in the perpendicular direction, and the half-cut sheet surface was ground with endless sandpaper with a sandpaper roughness number 320 to nap the surface layer, thereby providing artificial leather gray fabric with a thickness of 0.46 mm. The artificial leather gray fabric thus obtained was subjected to simultaneous shrinkage treatment and dyeing using a jet dyeing machine at a temperature of 120° C., followed by drying by a drying machine to provide artificial leather.

Formation of Resin Layers

The napped surface of the artificial leather obtained in the above step was subjected to gravure coating, which was repeated twice to form a two-layer polyurethane resin layer having a discontinuously coated surface. On the surface, resin layer portions are scattered like islands, and resin portions and napped portions are arranged discontinuously, with the resin portions accounting for 30% of the fabric surface. The leather-like fabric thus obtained had a feel of natural nubuck leather and a napped feel and air permeability of suede leather, as well as high wear resistance and stretchability. Results are given in Table 1.

Example 3

Fabric

A plain weave fabric composed of a polyester multifilament (33 dtex, 12 filaments) with a twist count of 1,800 T/m and a polyester multifilament (84 dtex, 288 filaments, average monofilament fineness 0.26 dtex) with a twist count of 1,800 T/m used as warp and weft, respectively, with a weaving density of 108 warp yarns per 2.54 cm and 92 weft yarns per 2.54 cm, was used instead of the artificial leather before resin layer formation. Subsequently, the surface layer was ground with endless card clothing to form a nap to provide a fabric with a thickness of 0.80 mm. The fabric thus obtained was dyed using a jet dyeing machine at a temperature of 130° C. and then dried by a drying machine to provide a fabric having a napped surface.

Formation of Resin Layers

Resin layers were formed on the napped surface of the fabric obtained in the above step by the same procedure as in Example 1. The leather-like fabric thus obtained had a feel of natural nubuck leather and a napped feel and air permeability of suede leather, as well as high wear resistance. Results are given in Table 1.

TABLE 1

|  |  |  | Example 1 | Example 2 | Example 3 |
|---|---|---|---|---|---|
| Resin layer formation | resin layer | number of layers | 3 | 2 | 3 |
|  | total thickness of resin layer | mm | 0.200 | 0.050 | 0.200 |
| Functionality evaluation | air permeability | cm³/cm² · s | 2.4 | 3.6 | 5.5 |
|  | wear resistance | class | 4 | 3 | 4 |
|  | friction coefficient | — | — | 0.48 | 0.34 | 0.30 |
|  | elongation percentage | % | — | 20 | — |
|  | stretch recovery rate | % | — | 85 | — |
| Surface feel evaluation | nubuck-like feel (wet feel) | feel | ◉ | ○ | ◉ |
|  | suede-like feel (napped feel) | feel | ○ | ◉ | ◉ |

Comparative Example 1

Raw Stock

Raw stock of sea-island type composite fiber was obtained by the same procedure as in Example 1.

Entangled Mass Composed of Nonwoven Fabric and Woven/Knitted Fabric

A laminated sheet composed of a nonwoven fabric formed of sea-island type composite fiber and a woven/knitted fabric was obtained by the same procedure as in Example 1.

Artificial Leather

Artificial leather was obtained by the same procedure as in Example 1.

Formation of Resin Layers

Except for forming a polyurethane resin layer having a discontinuously coated surface, the same procedure as in Example 1 was carried out to produce a leather-like fabric. On the surface, resin layer portions are scattered like islands, and resin portions and napped portions are arranged discontinuously, with the resin portions accounting for 8% of the fabric surface. The leather-like fabric thus obtained failed to have a feel of natural nubuck leather, and it was more like suede leather in terms of napped feel, and inferior in wear resistance. Results are given in Table 2.

Comparative Example 2

Raw Stock

Raw stock of sea-island type composite fiber was obtained by the same procedure as in Example 1.

Entangled Mass Composed of Nonwoven Fabric and Woven/Knitted Fabric

A laminated sheet composed of a nonwoven fabric formed of sea-island type composite fiber and a woven/knitted fabric was obtained by the same procedure as in Example 1.

Artificial Leather

Except for omitting the step of forming a nap on the surface layer by grinding with endless sandpaper, the same procedure as in Example 1 was carried out to produce artificial leather.

Formation of Resin Layers

A leather-like fabric was obtained by the same procedure as in Example 1. On the surface, resin layer portions are scattered like islands, and resin portions and non-napped portions are arranged discontinuously, with the resin portions accounting for 60% of the fabric surface. The leather-like fabric thus obtained had a feel of natural nubuck leather and high wear resistance, but totally failed to have a napped feel of suede leather. Actually, it had an inferior feel resembling synthesize leather. Results are given in Table 2.

TABLE 2

|  |  |  | Comparative example 1 | Comparative example 2 |
|---|---|---|---|---|
| Resin layer formation | resin layer | number of layers | 1 | |
|  | total thickness of resin layer | mm | 0.010 | 0.200 |
| Functionality evaluation | air permeability | cm³/cm² · s | 8.4 | 1.8 |
|  | wear resistance | class | 2 | 4 |
|  | friction coefficient | — | 0.70 | 0.30 |
|  | elongation percentage | % | — | — |
|  | stretch recovery rate | % | — | — |
| Surface feel evaluation | nubuck-like feel (wet feel) | feel | Δ | ◉ |
|  | suede-like feel (napped feel) | feel | ◉ | X |

The invention claimed is:

1. A leather-like fabric comprising a fibrous structure comprising ultrafine fibers having an average monofilament fineness of 0.0001 dtex or more and 0.5 dtex or less, at least one surface of the fibrous structure being napped, the napped surface having resin layers located discontinuously, and each of the resin layers containing two or more layers.

2. The leather-like fabric as claimed in claim 1, wherein each resin layer has a three-layer structure containing an adhesive layer, an interlayer, and an outer layer.

3. The leather-like fabric as claimed in claim 1, wherein each resin layer has a total thickness of 0.001 to 0.400 mm.

4. The leather-like fabric as claimed in claim 1, having an air permeability of 1.0 cm$^3$/cm$^2$·s or more as determined in fabric air permeability evaluation using the Frazier method specified in JIS L 1096 8.26.1.

5. The leather-like fabric as claimed in claim 1, having a friction coefficient of 0.6 or less between fabric surfaces as determined in fabric friction coefficient evaluation performed by the KES-SE method.

6. The leather-like fabric as claimed in claim 1, wherein the fibrous structure is artificial leather containing a polymeric elastomer inside the structure.

7. The leather-like fabric as claimed in claim 1, wherein the fibrous structure is artificial leather containing reinforcing cloth formed mainly of a woven/knitted fabric inside the structure.

8. The leather-like fabric as claimed in claim 1, having an elongation percentage of 15% or more and 35% or less in a warp direction and/or weft direction and an elongation recovery rate 70% or more and 100% or less in the warp direction and/or weft direction.

9. A leather-like fabric comprising a fibrous structure comprising ultrafine fibers having an average monofilament fineness of 0.0001 dtex or more and 0.5 dtex or less, at least one surface of the fibrous structure being napped, the napped surface having resin layers located discontinuously, and each of the resin layers containing two or more layers, wherein the leather-like fabric is rated as class 3 or higher in fabric wear resistance evaluation in terms of appearance deterioration after 1,000 abrasion cycles in Taber abrasion test specified in ASTM D3884.

* * * * *